June 24, 1924.
W. A. STEPHENS
ANTIGLARE DEVICE FOR AUTOMOBILE HEADLIGHTS
Filed June 10, 1921
1,499,083
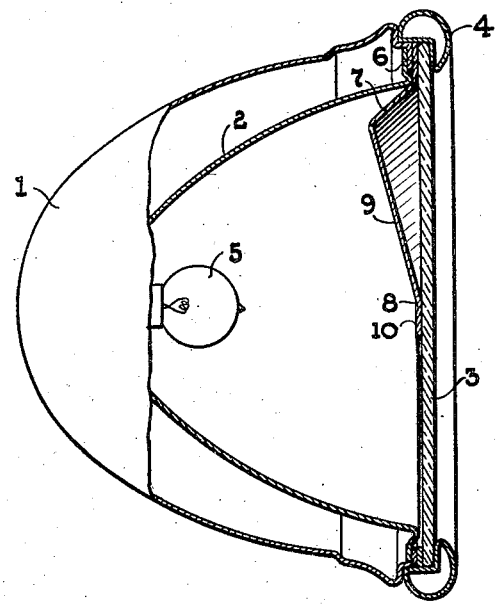
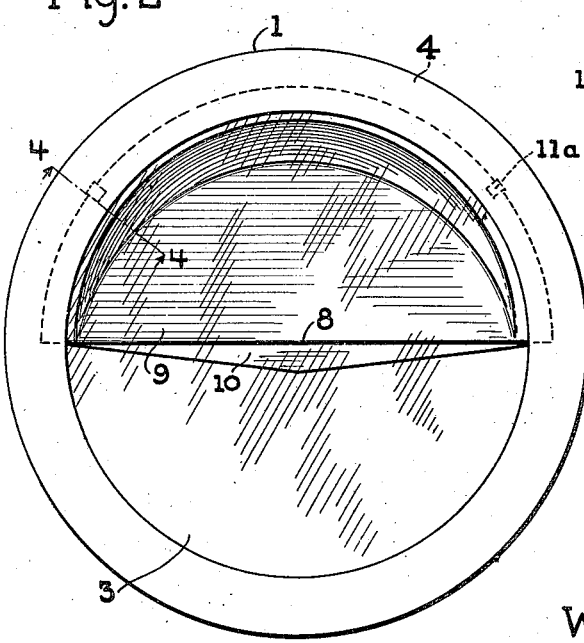
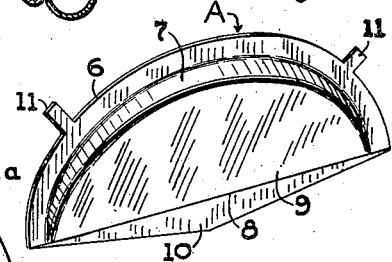
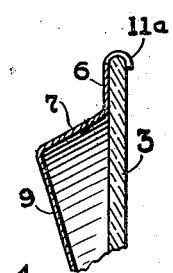
William A. Stephens
INVENTOR
WITNESSES
BY
ATTORNEY Patented June 24, 1924.

1,499,083

UNITED STATES PATENT OFFICE.

WILLIAM A. STEPHENS, OF OAKLAND, CALIFORNIA, ASSIGNOR TO REINHARDT T. HARDING, OF SAN FRANCISCO, CALIFORNIA.

ANTIGLARE DEVICE FOR AUTOMOBILE HEADLIGHTS.

Application filed June 10, 1921. Serial No. 476,506.

*To all whom it may concern:*

Be it known that I, WILLIAM A. STEPHENS, a citizen of the United States, residing at Oakland, in the county of Alameda and State of California, have invented a new and useful Antiglare Device for Automobile Headlights, of which the following is a specification.

This invention has reference to anti-glare devices for automobile headlights and its object is to provide a simple and efficient means for the purpose which is readily applicable to existing headlights and requires no replacements, nor demands the use of tools for its application.

In accordance with the invention it may comprise a single sheet of metal pressed into shape and introducible in the emitting end of the headlight casing behind the usual glass or lens, whereupon the light projected from the light unit of the headlight is hidden from the direct view of the observer, but is projected back and forth between the rear face of the anti-glare device and the ordinary headlight reflector, which may be considered as of parabolic form, until it escapes through the front of the headlight below the lower margin of the anti-glare device. The arrangement is such that the finally emitted light rays find their way to the surface of the roadway at too low a level to reach the eyes of pedestrians or others approaching or being approached by the vehicle on which the headlights are mounted.

The anti-glare device is so constructed and shaped that, while the free, light emitting opening at the front of the headlight casing is constricted, a large proportion of the light is reflected in such manner that it finds its way through the constricted opening and so, in large part, becomes available, although its path is directed in a predetermined course.

In order to accomplish the benefits of the anti-glare device it is made to fit the headlight opening so as to be anchored therein, and is dished so as to enter rearwardly into the headlight casing for about half of its upper area and is provided with a drop portion extending lower in its mid portion than the center line or focal axis of the light unit, which is usually in the form of an incandescent bulb.

The invention provides for the insertion of the anti-glare device immediately back of the lens or glass cover plate in such manner that no tools are needed for the purpose and no change need be made in the structure of the headlight.

The invention will be best understood from a consideration of the following detailed description taken in connection with the accompanying drawing, forming a part of this specification, with the understanding, however, that the invention is not confined to any strict conformity with the showing of the drawing, but may be changed and modified, so long as such changes and modifications mark no material departure from the salient features of the invention, as expressed in the appended claims.

In the drawing:—

Fig. 1, is a longitudinal section, in part in elevation, showing an automobile headlight equipped with the anti-glare device of the invention;

Fig. 2, is a face view of the structure shown in Fig. 1;

Fig. 3, is a perspective view from the rear, of the anti-glare device;

Fig. 4, is a section on the line 4—4 of Fig. 2, but drawn on a larger scale.

Referring to the drawing, there is shown a headlight casing 1, which may be considered as of ordinary construction and enclosing a reflector 2 of parabolic shape, although not necessarily confined to such particular shape. The emitting end of the reflector and of the headlight casing is covered by a glass plate 3, which may be either a plain glass plate or any one of many known special glass plates. The glass 3 is held in place by the usual retaining rim or bead 4, needing no special description. So far as the parts have been described, they may be of customary form. At the focal axis of the reflector 2, there is shown a headlight light giving unit 5, also of customary form.

The invention includes an anti-glare device or attachment A, shown separately and completely in Fig. 3, and which is designed to be located behind and thereby protected by the glass plate 3 in a location corresponding to the upper half of the mouth of the reflector 2 when properly installed.

In the simplest form, the anti-glare device A is made of sheet metal, and may be pressed into shape. It is composed of a substantially semicircular rim or flange 6, radially related to the remainder of the antiglare device A. Fast to the inner edge of the rim 6, at an angle thereto, is a crescent shaped continuation 7, narrowing from the mid-point of the continuation to the ends thereof, where it merges into a diameter 8, co-inciding with the opposite ends of the rim 6. Filling the space between the inner edge of the crescent 7, is a plate 9 of semi-circular shape, with its curved edge set back from the plane of the rim 6 because of the presence of the continuation 7, so that the plate 9 and continuation 7, although they may be formed in one piece, constitute a rearwardly-extending dishing of the attachment A.

Forming part of the attachment A and in one piece with the plate 9, is a drop 10 extending crosswise of the plate 9 along the diameter 8, but reducing in height from a midpoint to the ends, where the drop merges into the flange 6. At spaced points, the flange 6 is provided with lips or tongues 11 which, when the flange is back of the glass plate 3, may be bent over the latter to form sustaining hooks, shown at 11ª in Fig. 4, to retain the anti-glare device in place back of the glass plate, with the plate 9, which is flat, and the continuation 7, which is curved, in angular relation when considered in section. Moreover, the flange 6, and drop 10 are in one plane, so as to both bear flat against the inner face of the plate 3, with the flange 6 between the plate 3 and the reflector 2, whereby the several parts are clamped in place by the retaining bead or rim 4.

In order to make the outer face of the anti-glare attachment inconspicuous, it may be made black by painting, or enameling, or otherwise treating it, while the inner face, opposite the reflector 2 and lamp 5, may be plated or polished, or otherwise rendered reflective.

The lamp 5 is located in the focal axis of the reflector 2, and the relation between such focal axis and the drop 10, is such that the filament of the lamp is not visible to the eyes of an observer because of the presence of the drop 10, so long as the focal axis of the lamp is not higher than the customary 42 inches at which the light-giving elements of headlights are usually placed on automobiles.

If it be considered that the headlights are properly installed, and the anti-glare devices are also properly installed, and the lamps 5 are energized suitably for night driving, beams of light are emitted by the lamps 5, and, if permitted, would project from the headlight to the full extent of the normal opening thereof. With the anti-glare device A in place, about half of the full opening above the diameter 8 will have the light intercepted by the plate 9 and the continuation 7, with a small additional interception due to the drop 10 below the diameter 8. Considering the plate 9 and continuation 7 as formed of opaque material, no light passes through it, but there are numerous reflections set up within the reflector by the light projected by the lamp 5, and reflecting back and forth within the reflector due to the reflecting surface on the rear face of the anti-glare device. The tip of the plate 9, due to the angular dishing thereof, causes a progressive dropping of the light beams until they find escape through the front of the headlight below the drop 10, and ultimately issue from the headlight to reach the ground or roadway at a sufficient distance beyond the vehicle to abundantly illuminate the road, but at too low a level to annoy or blind an approaching pedestrian or vehicle's occupant.

Because of the angular dishing of the anti-glare device A, and the reflective quality of the rear face of such device, the actual diminution of the original intensity of the light, which might occur in the presence of the anti-glare device, is so reduced as to be negligible.

The anti-glare device is of a nature to make it capable of manufacture at a very low cost, of one piece of metal and by stamping. The device is also susceptible of installation with little labor, and practically without the aid of tools, or if tools be needed, by those usually found in the standard tool kit of practically all automobiles.

What is claimed is:—

1. In a parabolic reflector headlight for automobiles having a light unit at the focal point of the reflector, a glare-preventive attachment therefor, comprising a sheet of material rendered non-reflective to light to any material extent on the front face, and reflective of light on the rear face, said sheet conforming in outline to substantially a semi-circle and provided with a radial marginal flange, and at the diametric portion having a drop across substantially the focal axis of the headlight, the marginal flange and the drop portion being in substantially one plane perpendicular to said focal axis so as to bear flat against the inner face of the lens and the remainder of the body of the sheet being dished, with the greater part of the dished portion flat and slanted rearwardly and having a crescent-shaped junction with the marginal flange.

2. In a parabolic reflector headlight for automobiles having a light unit in the focal axis of the reflector, a glare-preventing attachment therefor, comprising a metallic sheet dark on the exterior face and rendered reflective on the interior face, said sheet being substantially semi-circular in outline and provided with a radial marginal flange, with fastening tongues continued therefrom and adapted to engage over the periphery of the lens, said sheet being provided at the diametric portion with a drop gradually decreasing in width from the mid-point to the margins, the marginal flange and drop portion being in substantially one plane so as to bear flat against the inner face of the lens, and the remainder of the body of the sheet being dished rearwardly with the dished portion flat and slanted rearwardly and provided with a crescent-shaped junction with the margin.

3. The combination with a headlight casing having an annular seat, a circular glass plate or lens, and a bead for clamping the same to the seat, of a screen secured to the inner side of the upper portion of the lens, said screen being substantially semi-circular and provided with a radial marginal flange, and at the diametric portion provided with a drop extending below the center of the lens, the marginal flange and drop portion being substantially in one plane so as to bear flat against the inner face of the lens, whereby the marginal flange is clamped between the lens and its seat, the remainder of the body of the screen being dished rearwardly with the dished portion flat and slanted rearwardly and provided with a crescent-shaped junction with the marginal flange.

4. The combination with a headlight casing having an annular seat, a circular glass plate or lens, and a bead for clamping the same to the seat, of a screen substantially semi-circular and provided with a circumferential marginal flange with fastening tongues continued therefrom and secured over the marginal edge of the lens and at the diametric portion having a drop extending in front of the central light rays, the circumferential flange and drop portion being substantially in one plane perpendicular to the focal axis so as to be held flat against the inner face of the lens by the clamping action of the lens and bead against the rim of the casing, and the remainder of the body of the screen being dished rearwardly with the dished portion flat and slanted rearwardly and provided with a crescent-shaped junction with the margin.

In testimony, that I claim the foregoing as my own, I have hereto affixed my signature.

WILLIAM A. STEPHENS.